Patented Apr. 28, 1931

1,802,867

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

AQUEOUS DISPERSION OF MATTER AND THE METHOD OF MAKING SAME

No Drawing.   Application filed May 10, 1927.  Serial No. 190,375.

This invention relates to aqueous dispersions of inaqueous colloidal substances treated with hydrophilic colloids.

I have found in the dispersing of inaqueous substances and in the treating of artificial or natural aqueous dispersions of inaqueous substances, soluble in organic solvents, with hydrophilic colloidal substances that if the latter are treated or dissolved with the aid of a mixture of lime either in a hydrated or oxide state and a water soluble sulphur compound such as the sulphides and/or sulphites of metals, preferably sodium or potassium, that the dispersion of the inaqueous colloidal substance is more stable and the hydrophilic colloid so treated will add many desirable qualities to the aqueous dispersion.

Among the many well known inaqueous colloidal substances soluble in organic solvents and usable in my invention might be mentioned pure or chemically treated cellulose or cellulose solutions, rubber and rubber containing gums or their natural latexes, chicle, coal tars, and coal tar resins, natural or artificial resins, shellac and asphalts. Among the hydrophilic colloidal substances usable are the various caseins, starches, saponin, gelatine, water soluble silicates, resin and oil soaps, water soluble gums such as gum arabic, tragacanth, karaya gum, albumins and Irish moss.

Among the processes of aqueously dispersing inaqueous substances may be mentioned the masticating of the colloidal substances, in the presence of a small amount of water, until a dispersed phase is reached, or the dispersion may be brought about by melting or dissolving the inaqueous colloid and then dispersing it with the aid of one or more of the hydrophilic colloids.

As an example of my invention I give the following:

| | Parts by weight |
|---|---|
| Rubber latex (approx. 35% rubber) | 100 |
| Casein | 20 |
| Lime | 4 |
| Sodium sulphite | 4 |
| Water | 70 |

The casein, lime and sodium sulphite are dissolved in the water and the rubber latex added thereto. It is preferable to dissolve the hydrophilic colloid before adding it to the aqueous dispersion of the inaqueous colloid when the said hydrophilic colloid needs an external solvent such as is the case when casein is used.

If, however, the hydrophilic colloid be gelatine, water-soluble gums, water-soluble soaps, some starches or other hydrophilic colloids not requiring an external solvent, then they may be dissolved without the aid of the lime and the reacting sulphur compound. As an example of such an embodiment of my invention, I give the following:

Part 1

| | Parts by weight |
|---|---|
| Gelatine (dry) | 10 |
| Tapioca starch | 5 |
| Resin soap | 10 |
| Water | 85 |

The gelatine, tapioca and soap are dissolved singly or jointly in the water.

Part 2

| | Parts by weight |
|---|---|
| Lime (calcium hydrate) | 5 |
| Sodium sulphite | 1 |
| Potassium sulphide | 2 |
| Water | 15 |

The solution formed by the dissolving of the lime and sulphur compounds in the water may be mixed with the solution of Part 1 or the dispersion of Part 3 hereinafter described. However, it is usually preferable to mix the solution of Part 2 with Part 1 to assist in the dissolving of the hydrophilic colloid.

Part 3

| | Parts by weight |
|---|---|
| Asphalt (aqueously dispersed and of creamy consistency) | 100 |

The asphalt in aqueous dispersion may be added to Parts 1 and 2, singly or jointly, or the asphalt may be added to Part 1 and aqueously dispersed therein.

The solutions of Parts 1 and 2 and the aqueous dispersion of the asphalt when mixed together may be used as a coating, binder or sizing. This composition is also well suited for the coating of articles to receive an electrogalvanic deposit. If there is a tendency for the material to run or sag on the coated article, 100 parts of a 30% solid content aqueous dispersion of rosin may be added thereto. Filling materials such as clays, metallic powders and oxides, asbestos, cellulose fibre, or ground wood may be also added to suit requirements for color, plasticity, flexibility or hardness.

It is often desirable to insolubilize or make the hydrophilic colloid irreversible. This can be done by adding an insolubilizing agent such as potassium chromate, formeldehyde, zinc chloride or hexamethylene to the composition when in aqueous dispersion or the finished product may be treated to an insolubilizing bath. When hydrophilic or aqueous colloidal substances of a nitrogenous or carbohydrate nature such as are herein mentioned are associated with water with or without alkaline content, there may be a tendency for these colloidal substances to mold, decompose or redissolve even when they are combined with water-insoluble substances. This undesirable action may be retarded or entirely stopped by treating the hydrophilic or aqueous colloidal substances either alone or in combination with other materials with insolubilizing agents which will tend to make them insoluble in water or water-resisting after the water has been once removed therefrom. The addition of such an agent will cause the colloidal substance to become insolubilized, that is, it will be made "irreversible", not ordinarily redissoluble in water. When the inaqueous colloid is rubber, it is preferable to add the insolubilizing agent before vulcanization. To insolubilize the casein in the example first above given may be added

|  | Parts by weight |
|---|---|
| Formaldehyde | ½ |
| Water | 5 | and to insolubilize the gelatine and starch of the second example may be added

|  | Parts by weight |
|---|---|
| Tannic acid | 1 |
| Water | 5 |
| Zinc chloride | ½ |

If desired, a coagulant may be used to partially or completely coagulate the whole mass. Such a coagulant may be any of the well known acids or acid salts.

I have further found that mixtures of the hydrophilic and inaqueous colloids when treated with the lime and water-soluble sulphur compound readily emulsify oily and fatty substances such as the drying oils like linseed, soya bean, china wood and also the non-drying and semi-drying oils like petroleum, castor, creosote or resin oils.

I have also found that water-soluble oxalates, tungstates, carbonates, fluorides and tri-sodium phosphates may be sometimes added advantageously to the lime or to the colloidal ingredients of the composition, especially when the hydrophilic colloids are casein, starches, or soaps.

While I have herein described some particular compositions embodying my invention and methods of producing the same, it is to be understood that the invention is not limited to the precise methods, ingredients or proportions mentioned.

Having thus described my invention, I claim and desire to protect by Letters Patent of the United States:

1. A composition of matter in aqueous dispersion comprising casein, lime, sodium sulphite and rubber latex.

2. A composition of matter in aqueous dispersion comprising casein 20 parts by weight, lime 4 parts, sodium sulphite 4 parts, rubber latex 100 parts and water 70 parts.

In witness whereof I have hereunto set my hand this 9th day of May, 1927.

ARTHUR BIDDLE.